(12) United States Patent
Sasaki

(10) Patent No.: US 7,635,831 B2
(45) Date of Patent: Dec. 22, 2009

(54) METHOD OF DETECTING INCLINATION AND INCLINATION DETECTING APPARATUS

(75) Inventor: Shinobu Sasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 281 days.

(21) Appl. No.: 11/363,497

(22) Filed: Feb. 27, 2006

(65) Prior Publication Data
US 2007/0115362 A1 May 24, 2007

(30) Foreign Application Priority Data
Nov. 18, 2005 (JP) .............. 2005-334965

(51) Int. Cl.
G01C 21/02 (2006.01)
G01C 21/24 (2006.01)
(52) U.S. Cl. ................... 250/206.2; 356/124
(58) Field of Classification Search .......... 250/206.2, 250/559.1, 559.3; 356/124; 700/215, 218, 700/254, 259
See application file for complete search history.

(56) References Cited

U.S. PATENT DOCUMENTS 6,584,236 B1 * 6/2003 Maruo et al. ........... 250/559.06
6,671,574 B1 12/2003 Hashimoto
2004/0251433 A1 * 12/2004 Typpo .................. 250/559.3

FOREIGN PATENT DOCUMENTS

| JP | 2001-1247000 A | 5/2001 |
| JP | 2002-93882 | 3/2002 |
| JP | 2002-154080 | 5/2002 |
| JP | 2004-93265 | 3/2004 |

OTHER PUBLICATIONS

Japanese Office Action dated Apr. 14, 2009 for Japanese Application No. 2005-334965. A partial English language translation is provided.

* cited by examiner

*Primary Examiner*—Seung C Sohn
(74) *Attorney, Agent, or Firm*—Fujitsu Patent Center

(57) ABSTRACT

The ratio is calculated between a first number of pixels and a second number of pixels on an image sensor. The first number of pixels is counted between two certain points projected on the image sensor from a first section of a plane. The second number of pixels is counted between two certain points projected on the image sensor from a second section, adjacent to the first section, of the plane. The number of pixels between two certain points increases if the image sensor gets closer to the plane, while the number of pixels between two certain points decreases if the image sensor gets remoter from the plane. The inclination of the image sensor can be determined relative to the plane based on the ratio between the two numbers of pixels. The attitude or inclination of the image sensor can in this manner be detected with a high accuracy.

14 Claims, 9 Drawing Sheets

METHOD OF DETECTING INCLINATION AND INCLINATION DETECTING APPARATUS

BACKGROUND OF THE INVENTION

1. Field of the Invention:

The present invention relates to a library apparatus including a storage cabinet defining cells and a grasping mechanism designed to move relative to the storage cabinet to access the individual cells. In particular, the invention relates to a method and an apparatus for detecting an inclination, preferably utilized to correct the attitude of the grasping mechanism in the library apparatus. The invention also relates to a method and an apparatus for controlling the position of an object, preferably utilized to correct the position of the grasping mechanism.

2. Description of the Prior Art:

A grasping unit is often utilized for transporting a magnetic tape cartridge in a magnetic tape library apparatus. The grasping unit is designed to move along a horizontal plane in the rectangular coordinates based on first and second rails perpendicular to each other. Likewise, the grasping unit is designed to move in the vertical direction based on the vertical movement of the first and second rails. The grasping unit can be positioned at a target cell through the horizontal and vertical movement. The attitude of the grasping unit is for example changed around the vertical axis to get opposed to a storage cabinet including the target cell prior to the vertical and horizontal movement. The grasping mechanism in this manner serves to insert and withdraw a magnetic tape cartridge into and from the target cell.

A positional error occurs between the storage cabinet and the first and second rails as well as between the storage cabinet and the grasping unit when the grasping unit is assembled in the magnetic tape library apparatus. Such a positional error hinders the accurate positioning of the grasping unit. As disclosed in Japanese Patent Application Publication 2004-93265, a CCD, charge-coupled device, sensor on the grasping unit may be utilized for measurement of the positional error, for example. The CCD sensor is designed to capture an image of a sign fixed on the storage cabinet. The position of the grasping unit can be compensated in the horizontal and/or vertical directions based on the captured image.

The attitude of the grasping unit can be changed around the vertical axis, for example. If the attitude of the grasping unit deviates from the standard attitude around the vertical axis, for example, the grasping unit cannot insert or withdraw a magnetic tape cartridge into or from the target cell even though the grasping unit is positioned right at the target cell.

SUMMARY OF THE INVENTION

It is accordingly an object of the present invention to provide a method and an apparatus for detecting the attitude or inclination of an object with a higher accuracy. It is also an object of the present invention to provide a method and an apparatus for controlling the position of an object, contributing to a higher accuracy in the control of the position of the object.

According to a first aspect of the present invention, there is provided a method of detecting an inclination, comprising: calculating the ratio between a first number of pixels and a second number of pixels on an image sensor, the first number of pixels being counted between two certain points projected on the image sensor from a first section of a plane, the second number of pixels being counted between two certain points projected on the image sensor from a second section, adjacent to the first section, of the plane; and determining an inclination of the image sensor based on the ratio and a reference ratio specifying a predetermined attitude of the image sensor.

The number of pixels counted between two certain points in the first section depends on the distance between the first section and the image sensor. Likewise, the number of pixels counted between two certain points in the second section depends on the distance between the second section and the image sensor. In other words, the number of pixels between two certain points increases if the image sensor gets closer to the plane, while the number of pixels between two certain points decreases if the image sensor gets remoter from the plane. Since the first and second sections are commonly defined on a single plane, the inclination of the image sensor can be determined relative to the plane based on the ratio between the two numbers of pixels. The attitude of the image sensor reflects the attitude or inclination of an object. The attitude or inclination of the object can in this manner be detected with accuracy.

A specific computer readable medium may be provided for realization of the method. The computer readable medium may contain program instructions allowing a processor to perform the method. The program instructions may comprise: computer program code causing the processor to calculate the ratio between a first number of pixels and a second number of pixels on an image sensor, the first number of pixels being counted between two certain points projected on the image sensor from a first section of a plane, the second number of pixels being counted between two certain points projected on the image sensor from a second section, adjacent to the first section, of the plane; and computer program code causing the processor to determine an inclination of the image sensor based on the ratio and a reference ratio specifying a predetermined attitude of the image sensor.

A specific inclination detecting apparatus may also be provided for realization of the method. In this case, the inclination detecting apparatus may comprise: an image sensor capturing an image of a first section on a plane and a second section adjacent to the first section of the plane; and a processing circuit determining an inclination of the image sensor based on the ratio calculated based on an image signal supplied from the image sensor and a reference ratio specifying a predetermined attitude of the image sensor, the ratio being calculated between the number of pixels counted between two certain points projected on the image sensor from the first section and the number of pixels counted between two certain points projected on the image sensor from the second section.

The inclination detecting apparatus may be utilized in a so-called library apparatus. In this case, the library apparatus may comprise: a storage cabinet defining cells; a grasping unit designed to move relative to the storage cabinet so as to individually access the cells; a sign immobilized relative to the storage cabinet, said sign including first and second marks on a first section of a plane and third and fourth marks on a second section, adjacent to the first section, of the plane; an image sensor mounted on the grasping unit, the image sensor designed to capture an image of the first and second sections of the plane; and a processing circuit determining an inclination of the image sensor based on the ratio calculated based on an image signal supplied from the image sensor and a reference ratio specifying a predetermined attitude of the image sensor, the ratio being calculated between the number of pixels counted between two certain points projected on the image sensor from the first section and the number of pixels counted between two certain points projected on the image sensor from the second section. The library apparatus of this type may include a magnetic tape library apparatus, for example.

According to a second aspect of the present invention, there is provided a method of controlling the position of an object, comprising: determining the number of pixels between first and second points projected on an image sensor from a plane when the image sensor mounted on the object is spaced from the plane by a predetermined distance at a moment of capturing an image of the plane; and determining a difference between a reference distance and the predetermined distance based on the number of pixels and the number of pixels counted between the first and second points projected on the image sensor from the plane when the image sensor is spaced from the plane by the reference distance.

The number of pixels decreases between the first and second points projected on the image sensor from the plane if the object gets remoter from the plane. Likewise, the number of pixels increases between the first and second points projected on the image sensor from the plane if the object gets closer to the plane. If a predetermined number of pixels is designed to correspond to the reference distance, an increase or decrease from the predetermined number of pixels reflects a deviation from the reference distance. The deviation can be utilized to accurately control the position of the object.

A specific computer readable medium may be provided for realization of the method. The computer readable medium may contain program instructions allowing a processor to perform the above-described method. The program instructions may comprise: computer program code causing the processor to determine the number of pixels between first and second points projected on an image sensor from a plane when the image sensor mounted on the object is spaced from the plane by a predetermined distance at a moment of capturing an image of the plane; and computer program code causing the processor to determine a difference between a reference distance and the predetermined distance based on the number of pixels and the number of pixels counted between the first and second points projected on the image sensor from the plane when the image sensor is spaced from the plane by the reference distance.

A specific position controlling apparatus may also be provided for realization of the method. In this case, the position controlling apparatus may comprise: an image sensor mounted on an object, the image sensor designed to capture an image of a plane; and a processing circuit determining a difference between a reference distance and a predetermined distance based on a first number of pixels and a second number of pixels, the first number of pixels being counted between first and second points projected on the image sensor from the plane when the image sensor is spaced from the plane by the reference distance, the second number of pixels being counted between the first and second points projected on the image sensor from the plane when the image sensor is spaced from the plane by the predetermined distance.

The position controlling apparatus may be utilized in a library apparatus. In this case, the library apparatus may comprise: a storage cabinet defining cells; a grasping unit designed to move relative to the storage cabinet so as to individually access the cells; a sign immobilized relative to the storage cabinet, said sign including first and second points on a plane; an image sensor mounted on the grasping unit, the image sensor designed to capture an image of the first and second points on the plane; and a processing circuit determining a difference between a reference distance and a predetermined distance based on a first number of pixels and a second number of pixels, the first number of pixels being counted between first and second points projected on the image sensor from the plane when the image sensor is spaced from the plane by the reference distance, the second number of pixels being counted between the first and second points projected on the image sensor from the plane when the image sensor is spaced from the plane by the predetermined distance. The library apparatus of this type may include a magnetic tape library apparatus, for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
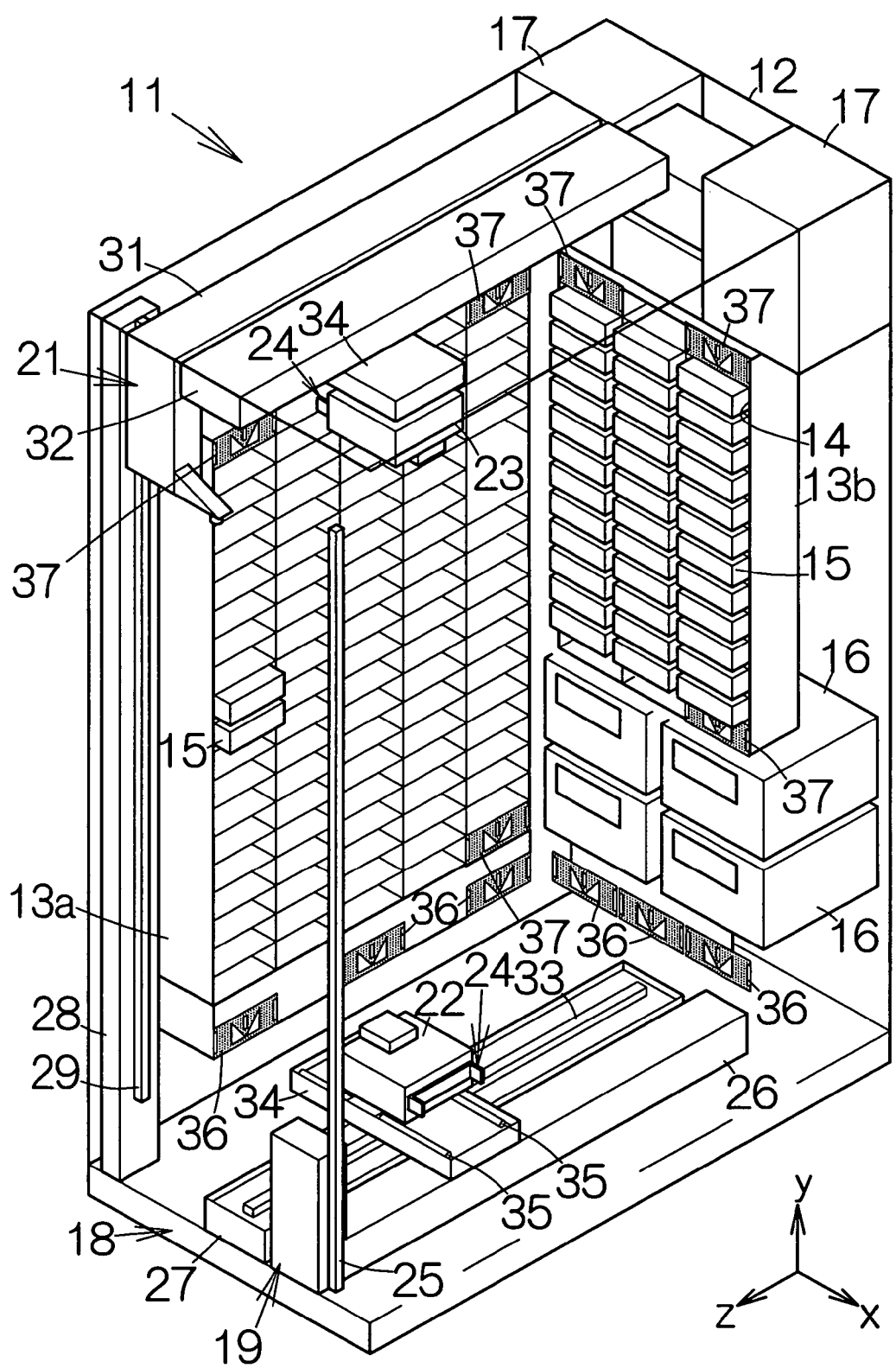
FIG. 1 is a perspective view schematically illustrating the overall structure of a magnetic tape library apparatus.

FIG. 1 schematically illustrates a magnetic tape library apparatus 11 as an example of a library apparatus according to the present invention. The magnetic tape library apparatus 11 includes a box-shaped enclosure 12. The enclosure 12 defines an inner space in the shape of a parallelepiped standing upright from a floor, for example. Storage cabinets 13a, 13b are placed within the inner space of the enclosure 12. A pair of storage cabinets 13a is opposed to each other facing a predetermined central space of a parallelepiped. Another storage cabinet 13b is placed at a position adjacent the central space. Each of the storage cabinets 13a, 13a, 13b includes cells 14, 14, . . . arranged along a plane upright to the floor, namely a side surface of the central space. Objects or recording media such as magnetic tape cartridges 15 are contained within the individual cells 14. A linear tape-open (LTO) cartridge may be employed as the magnetic tape cartridge 15, for example.

Here, an xyz-coordinate system is defined in the central space. The y-axis of the xyz coordinate system is set perpendicular to the floor. The parallel columns of the cells 14 extend in the vertical direction in parallel with the y-axis in the individual storage cabinets 13a, 13b. The z-axis of the xyz coordinate system is set to extend in the horizontal direction in parallel with the storage cabinets 13a, 13a. The parallel rows of the cells 14 extend in the horizontal direction in parallel with the z-axis in the storage cabinet 13a. The x-axis of the xyz-coordinate system is set to extend in the horizontal direction in parallel with the storage cabinet 13b. The parallel rows of the cells 14 extend in the horizontal direction in parallel with the x-axis in the storage cabinet 13b.

Recording medium drives or magnetic tape drives 16, four of them in this case, are incorporated in the inner space of the enclosure 12, for example. The magnetic tape drives 16 are designed to write magnetic information data into a magnetic recording tape inside the magnetic tap cartridge 15. The magnetic tape drives 16 are also designed to read magnetic information data out of the magnetic recording tape inside the magnetic tape cartridge 15. The magnetic tape cartridge 15 is inserted into and withdrawn from the magnetic tape drive 16 through a slot. The magnetic recording tape is unwound from a reel within the magnetic tape cartridge 15 in the magnetic tape drive 16. The unwound magnetic recording tape is then wound around a reel within the magnetic tape drive 16.

A pair of storage boxes 17, 17 is incorporated in the inner space of the enclosure 12, for example. A library controller board and a first controller board are contained within one of the storage boxes 17. A second controller board is contained within the other of the storage boxes 17. The library controller board and the first and second controller boards will be described later in detail. An outside host computer, not shown, is connected to the library controller board. Various processings are executed in the library controller board as well as the first and second controller boards based on data and/or instructions supplied from the host computer.

A transport mechanism 18 is incorporated within the central space in the enclosure 12. The transport mechanism 18 includes first and second transport robots 19, 21. The first and second transport robots 19, 21 are designed to carry the magnetic tape cartridge 15 between the individual cells 14, 14, . . . and the individual magnetic tape drives 16.

The first and second transport robots 19, 21 include first and second mobile units namely first and second hands 22, 23, respectively. A grasping mechanism 24 is incorporated in each of the first and second hands 22, 23. The grasping mechanism 24 is designed to hold the magnetic tape cartridge 15. Each of the first and second hands 22, 23 is allowed to oppose the grasping mechanism 24 to the opening of the individual cells 14. The grasping mechanism 24 will be described later in detail.

The first transport robot 19 is coupled to a first support column, not shown, standing upright from the floor. A first rail 25 is fixed to the first support column. The first rail 25 extends in the vertical direction. A supporting member or guiding member 26 is coupled to the first rail 25. A first rail base 27 is coupled to the guiding member 26. The guiding member 26 and the first rail base 27 respectively extend in the horizontal direction in parallel with the storage cabinets 13a, 13a. The first rail base 27 is placed at an intermediate position equally spaced from the storage cabinets 13a, 13a.

The guiding member 26 and the first rail base 27 are allowed to move upward and downward along the first rail 25 in parallel with the y-axis. A drive mechanism is connected to the guiding member 26 for the upward and downward movement. The drive mechanism may include a belt coupled to the guiding member 26 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter.

Likewise, the second transport robot 21 is coupled to a second support column 28 standing upright from the floor. A first rail 29 is fixed to the second support column 28. The first rail 29 extends in the vertical direction. A supporting member or guiding member 31 is coupled to the first rail 29. A first rail base 32 is coupled to the guiding member 31. The guiding member 31 and the first rail base 32 extend in the horizontal direction in parallel with the storage cabinets 13a, 13a. The first rail base 32 is placed at an intermediate position equally spaced from the storage cabinets 13a, 13a.

The guiding member 31 and the first rail base 32 are allowed to move upward and downward along the first rail 29 in parallel with the y-axis. A drive mechanism is connected to the guiding member 31 for the upward and downward movement. The drive mechanism may include a belt coupled to the guiding member 31 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter. The guiding members 26, 31 as well as the first rail bases 27, 32 are arranged and spaced in the vertical direction or in the direction of the y-axis. The first rail base 32 of the second transport robot 21 moves in the vertical direction in a space above the first rail base 27 of the first transport robot 19.

A second rail 33 is incorporated in each of the first rail bases 27, 32. The second rail 33 extends in the horizontal direction in parallel with the storage cabinets 13a, 13a. A second rail base 34 is coupled to the second rail 33. The second rail base 34 extends in the horizontal direction in parallel with the storage cabinet 13b. The second rail base 34 is designed to move in the horizontal direction along the second rail 33 in parallel with the z-axis. A drive mechanism is connected to the second rail base 34 for the horizontal movement. The drive mechanism may include an endless belt wound around a pair of pulleys on the first rail base 27, 32, and a power source establishing a driving force to drive one of the pulleys for rotation, for example. An electric motor may be utilized as the power source. A stepping motor may be employed as the electric motor, for example. The electric motor is referred to a "z-axis electric motor" hereinafter.

A pair of third rails 35, 35 is incorporated in each of the second rail bases 34, 34, respectively. The third rails 35 extend in the horizontal direction in parallel with the storage cabinet 13b. The first and second hands 22, 23 are coupled to the third rails 35. The first and second hands 22, 23 are thus allowed to move along the corresponding third rails 35 in the horizontal direction in parallel with the x-axis. A drive mechanism is connected to the first and second hands 22, 23, respectively, for the horizontal movement. The drive mechanism may include an endless belt wound around a pair of pulleys on the second rail base 34, and a power source establishing a driving force to drive one of the pulleys for rotation, for example. The endless belt may be coupled to the first and second hands 22, 23, respectively. An electric motor may be utilized as the power source. A stepping motor may be employed as the electric motor, for example. The electric motor is referred to as "x-axis electric motor" hereinafter.

Moreover, each of the first and second hands 22, 23 is coupled to the corresponding second rail base 34 for relative rotation around a rotation axis parallel to a vertical axis or y-axis. A drive mechanism is connected to the first and second hands 22, 23, respectively, for the relative rotation. The drive mechanism may include an endless belt wound around a rotation shaft on the first or second hand 22, 23 and a pulley on the corresponding second rail base 31, and a power source establishing a driving force to drive the pulley for rotation, for example. An electric motor may be utilized as the power source. A stepping motor may be employed as the electric motor, for example. The electric motor is referred to as "revolution electric motor" hereinafter.

Sign boards 36, 37 are related to the individual storage cabinets 13a, 13b. The sign boards 36, 37 are classified into first sign boards 36 and second sign boards 37. The first sign boards 36 are located at a position distanced from the openings of the cells 14 in the individual storage cabinets 13a, 13b. The second sign boards 37 are located at the openings of the cells 14 at the corners, three of them in this case, in the individual storage cabinets 13a, 13b. A predetermined colored pattern is established on the surfaces of the sign boards 36, 37 as described later.

The coordinates of the xyz-coordinate system and the angle around the rotation axis serve to identify the position of the cells 14 in the magnetic tape library apparatus 11. The first and second hands 22, 23 on the first and second transport robots 19, 21 are positioned based on the coordinates of the xyz-coordinate system. The attitude or orientation of the first and second hands 22, 23 are determined based on the angle of rotation around the rotation axis. When the first or second hand 22, 23 is positioned based on the coordinates set for a selected one of the cells 14 and controlled for rotation based on the angle of rotation, the first or second hand 22, 23 is allowed to direct the grasping mechanism 24 exactly to the opening of the selected cell 14.

Figure 2:
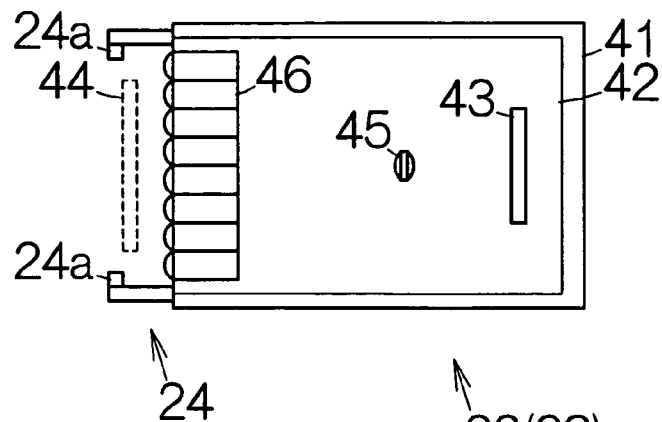
FIG. 2 is an enlarged plan view schematically illustrating the structure of first and second hands.

As shown in FIG. 2, the grasping mechanism 24 includes a pair of claws or hooks 24a, 24a extending forward from a base 41 of the grasping mechanism 24. The claws 24a are designed to shift between a first position and a second position. The claws 24a are spaced from each other in the horizontal direction at a first distance when the claws 24a take the first position. The claws 24a are spaced from each other in the horizontal direction at a second distance smaller than the first distance when the claws 24a take the second position. The claws 24a at the first position define therebetween a space sufficient for the magnetic tape cartridge 15 to pass through. The claws 24a at the second position catch the magnetic tape cartridge 15 therebetween. The magnetic tape cartridge 15 is in this manner held in the grasping mechanism 24, namely in the hands 22, 23. A drive mechanism, not shown, is connected to the claws 24a for the movement between the first and second positions. A so-called rack-and-pinion mechanism may be employed as the drive mechanism, for example. A specific power source may be connected to the pinion of the rack-and-pinion mechanism. An electric motor may be employed as the power source. A stepping motor may be utilized as the electric motor, for example. The electric motor is referred to as "grasping electric motor" hereinafter.

A printed circuit board 42 is also mounted on the base 41 in the first and second hands 22, 23, respectively. The printed circuit board 42 extends along a horizontal plane. A line CCD, charge-coupled device, 43 is mounted on the upper surface of the printed circuit board 42. The line CCD 43 includes pixels lined in the horizontal direction. The line CCD 43 may discriminate at least between white and black of each pixel, for example. The line CCD 43 is designed to receive light in the vertical direction perpendicular to the upper surface of the printed circuit board 42.

A target space 44 is defined in front of the base 41 in the first and second hands 22, 23, respectively. The target space 44 extends in the horizontal direction. An optical path is established between the target space 44 and the line CCD 43. A condensing lens 45 is mounted on the printed circuit board 42 for establishment of the optical path. The condensing lens 45 serves to establish a focused image of an object within the target space 44 on the line CCD 43.

A LED (light-emitting diode) lamp 46 is mounted on the upper surface of the printed circuit board 42. The LED lamp 46 includes LED elements arranged in the horizontal direction, namely a LED array. The LED lamp 46 emits light toward the target space 44. The target space 44 is in this manner lighted up.

Figure 3:
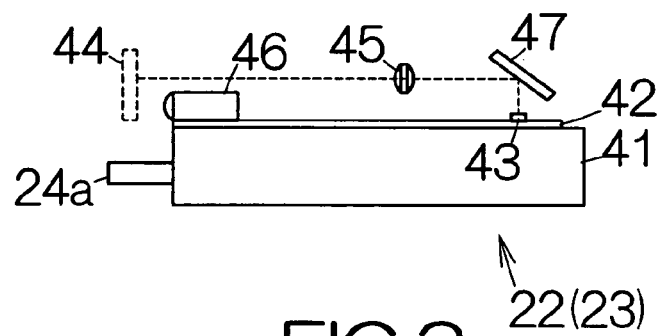
FIG. 3 is an enlarged side view of the first and second hands.

As is apparent from FIG. 3, a reflector 47 is mounted on the printed circuit board 42 for establishment of the optical path. The reflector 47 serves to refract light at right angles. The light is led in the horizontal direction from the target space 44 to the reflector 47. The condensing lens 45 condenses the light between the target space 44 and the reflector 47. The reflected light from the reflector 47 reaches the line CCD 43. A specific supporting member, not shown, may be utilized for supporting the reflector 47 on the printed circuit board 42.

The line CCD 43 is in this manner allowed to capture the image of an object located within the target space 44. When the magnetic tape cartridge 15 is held between the claws 24a, 24a, for example, a bar code label attached on the surface of the magnetic tape cartridge 15 is positioned within the target space 44. The sign boards 36, 37 are also positioned within the target space 44 as described later. The bar code label and the sign boards 36, 37 are in this manner scanned.

Figure 4:
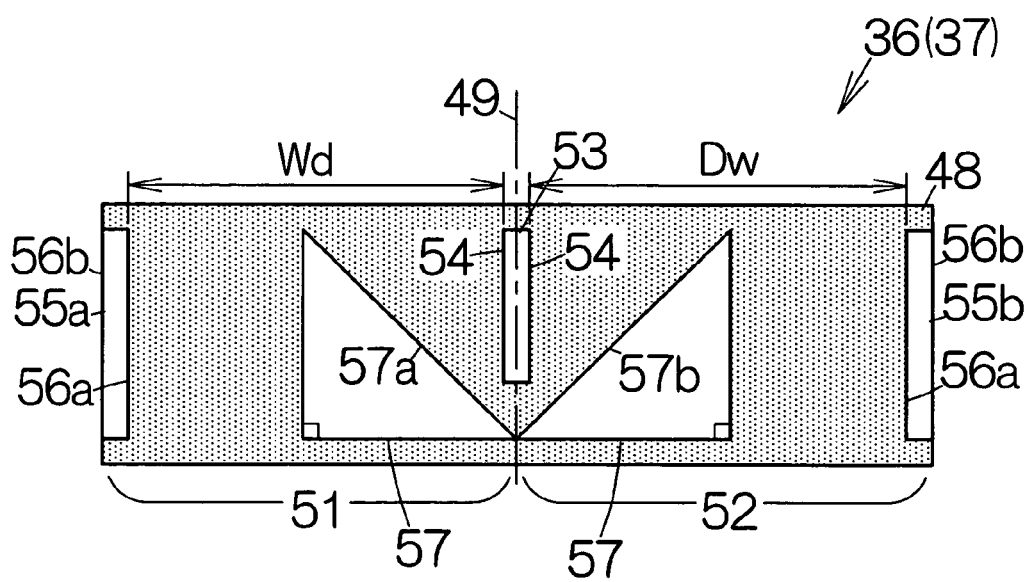
FIG. 4 is an enlarged plan view of a sign board.

Here, a detailed description will be made on the sign boards 36, 37. The sign board 36, 37 includes a black surface, namely a flat surface 48, as shown in FIG. 4. A centerline 49 is set on the flat surface 48 to halve the flat surface 48 into a first section 51 on the left and a second section 52 on the right. The first section 51 contacts with the second section 52 at the centerline 49. The aforementioned colored pattern is symmetrically established relative to the centerline 49.

The colored pattern includes a white center strip 53. The center strip 53 is designed to extend in the vertical direction on the centerline 49. The center strip 53 is contoured with a pair of marking lines 54, 54 extending in the vertical direction in parallel with the centerline 49. The colored pattern also includes a pair of left and right white side strips 55a, 55b. The side strips 55a, 55b are designed to extend in the vertical direction within the first and second sections 51, 52, respectively. The side strips 55a, 55b are contoured with a pair of auxiliary marking lines 56a, 56b extending in the vertical direction in parallel with the centerline 49. The auxiliary marking lines 56b of the side strips 55a, 55b correspond to the left and right edges of the sign boards 36, 37. Here, the interval Wd between the left side strip 55a and the centerline 49 is set equal to the interval Dw between the centerline 49 and the right side strip 55b. The interval of the auxiliary marking lines 56a, 56b in the individual side strips 55a, 55b is set identical to that of the marking lines 54, 54 in the center strip 53.

The colored pattern also includes white isosceles right triangles 57 in the first and second sections 51, 52. The isosceles right triangle 57 of the first section 51 allows the hypotenuse 57a to extend left and upward from the centerline 49. The isosceles right triangle 57 of the second section 52 allows the hypotenuse 57b to extend right and upward from the centerline 49. One of the sides other than the hypotenuse 57a, 57b is set parallel to the centerline 49 in the isosceles right triangles 57. The other of the sides other than the hypotenuse 57a, 57b is set perpendicular to the centerline 49.

Figure 5:
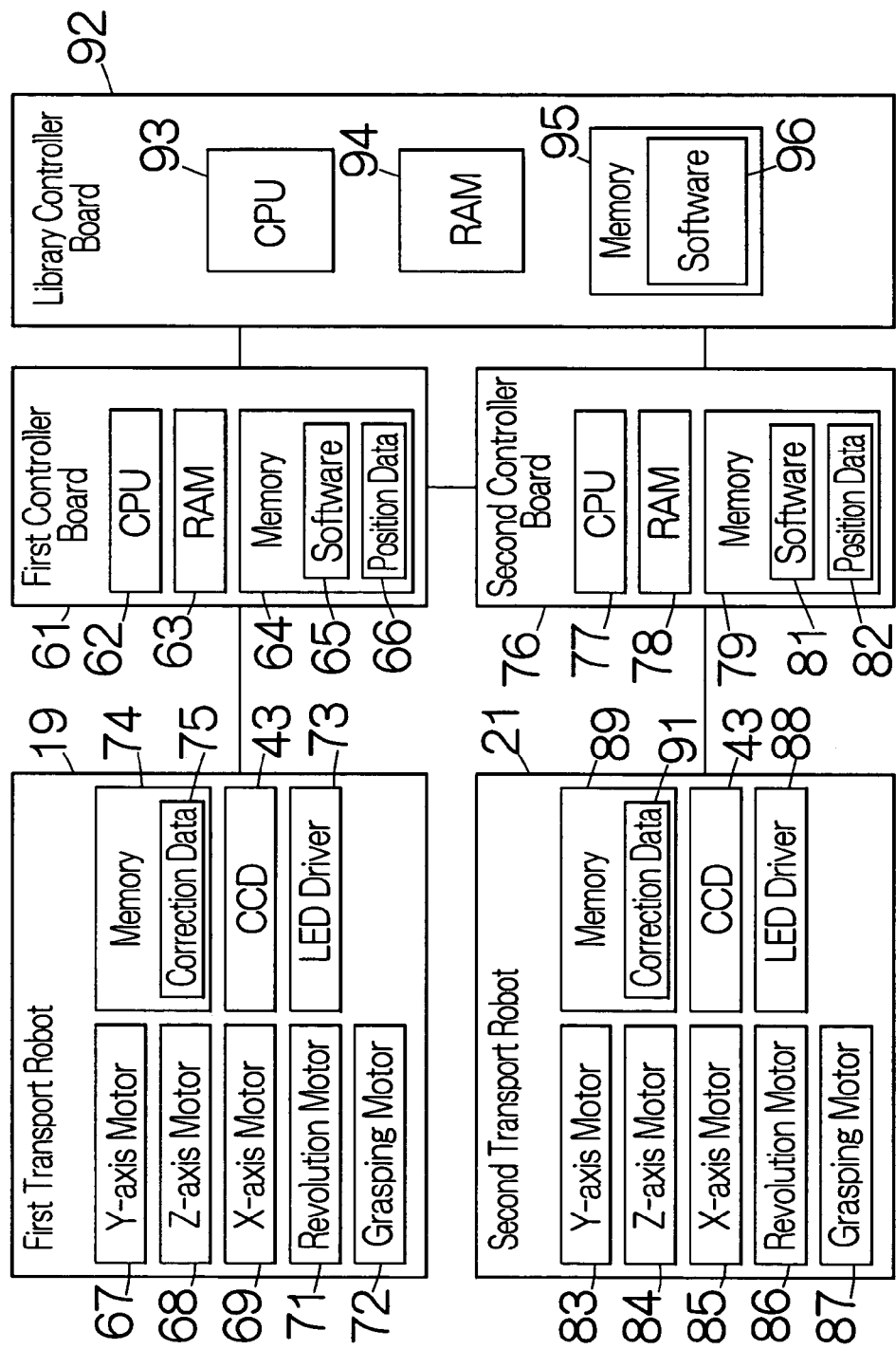
FIG. 5 is a block diagram schematically illustrating the structure of a library controller board as well as first and second controller boards.

As shown in FIG. 5, the first controller board 61 is connected to the first transport robot 19. A first controller circuit or central processing unit (CPU) 62 is mounted on the first controller board 61. A random access memory (RAM) 63 and a non-volatile memory 64 are connected to the CPU 62. A flash memory may be utilized as the non-volatile memory 64, for example.

A software program 65 and a position data 66 are stored in the non-volatile memory 64. The position data 66 specifies the position of the openings of the individual cells 14, 14, .... The x-, y- and z-coordinates and the angle of the first hand 22 around the rotation axis are designated in the position data 66. The CPU 62 is allowed to execute predetermined processings based on the software program 65 and the position data 66 temporarily stored in the RAM 63, for example.

The y-axis electric motor 67, the z-axis electric motor 68, the x-axis electric motor 69, the revolution electric motor 71, and the grasping electric motor 72 in the first transport robot 19 are connected to the CPU 62. The CPU 62 is designed to supply driving signals to these electric motors 67-72, respectively. Each of the electric motors 67-72 is controlled to rotate over an angle or amount set based on the supplied driving signals. The angle or amount of rotation set for the electric motors 67-72 serves to determine the amounts of movement in the y-, z- and x-axes and the amount of rotation around the rotation axis, of the first hand 22, as well as the amount of movement of the grasping mechanism 24 in the first hand 22.

The aforementioned line CCD 43 and a light-emitted diode (LED) driver 73 are also connected to the CPU 62. The line CCD 43 supplies the CPU 62 with a discrimination signal specifying white or black of each pixel. The LED driver 73 controls the radiance of the LED lamp 46. The LED lamp 46 in this case receives a driving signal from the LED driver 73. The radiation of the LED lamp 46 is controlled based on a control signal supplied from the CPU 62 to the LED driver 73.

A non-volatile memory 74 is further incorporated in the first transport robot 19. A correction data 75 is stored in the non-volatile memory 74. The correction data 75 specifies the positional relationship between the grasping mechanism 24 and the line CCD 43 on the first hand 22. The correction data 75 will be described later in detail.

A second controller board 76 is connected to the second transport robot 21. A second controller circuit or central processing unit (CPU) 77 is mounted on the second controller board 76. A random access memory (RAM) 78 and a non-volatile memory 79 are connected to the CPU 77. A flash memory may be utilized as the non-volatile memory 79, for example. A software program 81 and a position data 82 are stored in the non-volatile memory 79 in the same manner as described above. The position data specifies the position of the openings for the individual cells 14, 14, . . . in the aforementioned manner. The x-, y- and z-coordinates and the angle of the second hand 23 around the rotation axis are designated in the position data as described above. The CPU 77 is allowed to execute predetermined processings based on the software program 81 and the position data 82 temporarily stored in the RAM 78.

The y-axis electric motor 83, the z-axis electric motor 84, the x-axis electric motor 85, the revolution electric motor 86, and the grasping electric motor 87 in the second transport robot 21 are connected to the CPU 77. The CPU 77 is designed to supply driving signals to these electric motors 83-87, respectively. Each of the electric motors 83-87 is controlled to rotate over an angle or amount set based on the driving signals. The angle or amount of rotation set for each of the electric motors 83-87 serves to determine the amounts of movement in the y-, z- and x-axes and the amount of rotation around the rotation axis, of the second hand 23, as well as the amount of movement of the grasping mechanism 24 in the second hand 23.

The aforementioned line CCD 43 and a light-emitted diode (LED) driver 88 are connected to the CPU 77 in the same manner as described above. The line CCD 43 supplies the CPU 77 with a discrimination signal specifying white or black of each pixel. The LED driver 88 controls the radiance of the LED lamp 46. The LED lamp 46 in this case receives a driving signal from the LED driver 73. The radiation of the LED lamp 46 is controlled based on a control signal supplied from the CPU 77 to the LED driver 88.

A non-volatile memory 89 is further incorporated in the second transport robot 21. A correction data 91 is stored in the non-volatile memory 89. The correction data 91 is formed in the same manner as the correction data 75. The correction data 91 specifies the positional relationship between the grasping mechanism 24 and the line CCD 43 on the second hand 23.

The first and second controller boards 61, 76 are connected to a library controller board 92. The library controller board 92 includes a CPU 93, RAM 94 and a non-volatile memory 95, for example. A software program 96 is stored in the non-volatile memory 95. The CPU 92 is allowed to execute predetermined processings based on the software program 96 temporarily stored in the RAM 94, for example. The library controller board 92 is connected to the host computer.

Next, description will be made on the operation of the magnetic tape library apparatus 11. The CPU 93 on the library controller board 92 executes the library control based on the software program 96 in the non-volatile memory 95. When the library controller board 92 receives instructions for write or read operations of data from the host computer, the library controller board 92 first determines a target magnetic tape cartridge 15. This determination allows the library controller board 92 to determine one of the cells 14 in the storage cabinets 13a, 13b. The determined cell 14 contains the target magnetic tape cartridge 15.

One of the cells 14 is previously assigned to the individual magnetic tape cartridges 15, respectively. Database is established in the library controller board 92 for the assignment, for example. The cells 14, 14, . . . are related to identifiers of the magnetic tape cartridges 15 in the database, respectively. A bar code located on the magnetic tape cartridge 15 is utilized for establishment of the-relation. The identifier is assigned to the individual magnetic tape cartridges 15, respectively. The line CCD 43 is utilized to scan the bar code.

The determined cell 14 is notified to the first controller board 61 from the library controller board 92. The CPU 62 on the first controller board 61 instructs the first transport robot 19 to operate based on the software program 65 in the non-volatile memory 64. The first controller board 61 in this case determines the position of the determined cell 14 based on the position data 66. The amounts of movement in the y-, z- and x-axes and the amount of rotation around the rotation axis, of the first hand 22, are determined based on the position of the determined cell 14. Driving signals are supplied to the electric motors 67-72 based on the determined amounts of the movement and rotation, respectively. The driving signals enable the grasping mechanism 24 on the first hand 22 to get opposed to the opening of the determined cell 14 or the slot of the magnetic tape drive 16.

Figure 6:
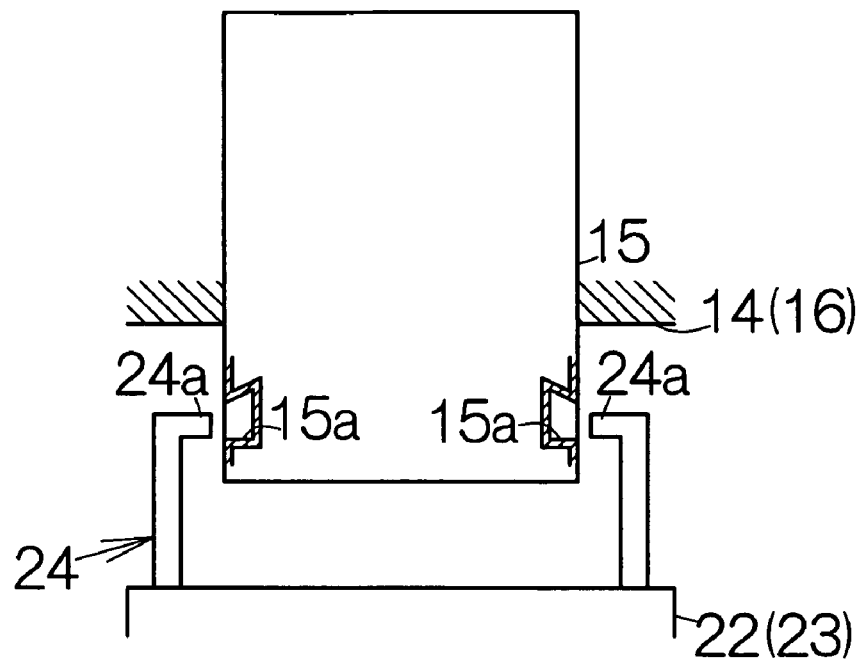
FIG. 6 is an enlarged plan view of claws at a first position.

As shown in FIG. 6, when the grasping mechanism 24 is opposed to the opening of the determined cell 14 or the slot of the magnetic tape drive 16, the magnetic tape cartridge 15 is located in a space between the claws 24a set at the first position. The tip ends of the claws 24a are opposed to apertures 15a on the magnetic tape cartridge 15, respectively. The apertures 15a are opened outward at positions on a common straight line connecting the tip ends of the claws 24a to each other.

Figure 7:
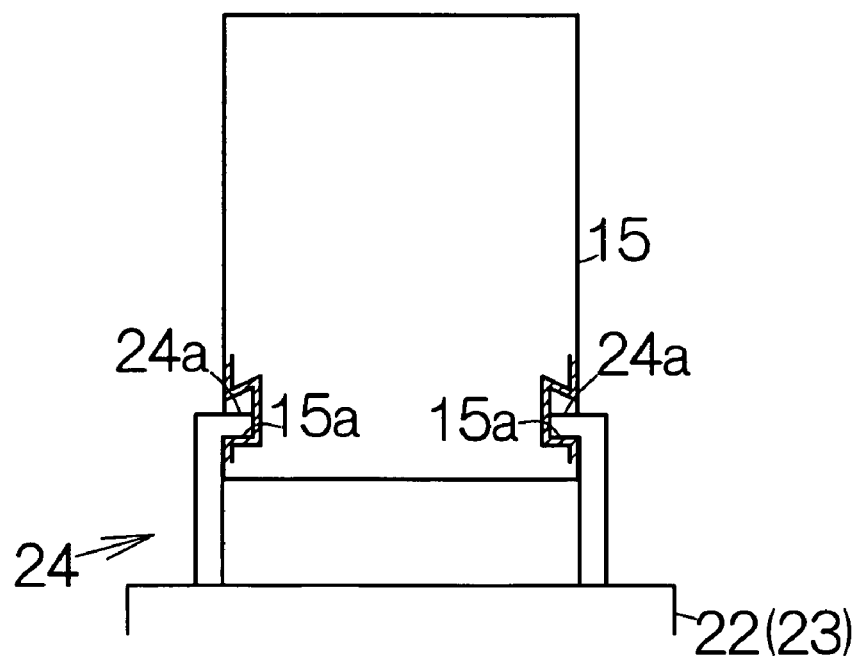
FIG. 7 is an enlarged plan view of claws at a second position.

The claws 24a then shift from the first position to the second position. The claws 24a thus get closer to each other. The magnetic tape cartridge 15 is held between the claws 24a, as shown in FIG. 7. The apertures 15a receive the insertion of the tip ends of the claws 24a. The grasping mechanism 24 is subsequently withdrawn into the first hand 22. The magnetic tape cartridge 15 is in this manner fully received in the first hand 22. The first hand 22 then starts moving.

The magnetic tape cartridge 15 in the first hand 22 is inserted into the cell 14 or the magnetic tape drive 16 based on the back-and-forth movement of the grasping mechanism 24. When the claws 24a shift from the second position to the first position after the claws 24a have completed the insertion of the magnetic tape cartridge 15, the grasping mechanism 24 is decoupled from the magnetic tape cartridge 15. The magnetic tape cartridge 15 is in this manner received in the cell 14 or the magnetic tape drive 16. The first hand 22 then takes in the grasping mechanism 24. The first hand 22 stands by for the next movement.

The magnetic tape cartridge 15 is transported between the cell 14 and the magnetic tape drive 16 in the aforementioned manner. The magnetic tape drive 16 serves to read data recorded in the magnetic tape cartridge 15 and write data into the magnetic tape cartridge 15. The second transport robot 21 stays at a predetermined off position or uppermost position. The second transport robot 21 operates to transport the magnetic tape cartridge 15 while the first transport robot 19 is out of operation. The second transport robot 21 may be controlled in the same manner as the first transport robot 19. The first transport robot 19 stays at a predetermined off position or lowermost position, when the second transport robot 21 is in operation.

The magnetic tape library apparatus 11 is subjected to an alignment prior to the transportation of the magnetic tape cartridge 15. The alignment enables amendment to the position data 66, 82 of the first and second controller boards 61, 76. The alignment serves to specify the access positions and attitudes of the first and second hands 22, 23 in the imaginary xyz-coordinate system based on actual values. The grasping mechanism 24 is thus allowed to reliably hold the magnetic tape cartridge 15 in the cell 14 or the magnetic tape drive 16 based on the access positions and attitudes. The alignment may be carried out when the assembling of the magnetic tape library apparatus 11 has been completed in a factory, when the magnetic tape library apparatus 11 has been installed in a facility, or the like, for example.

Figure 8:
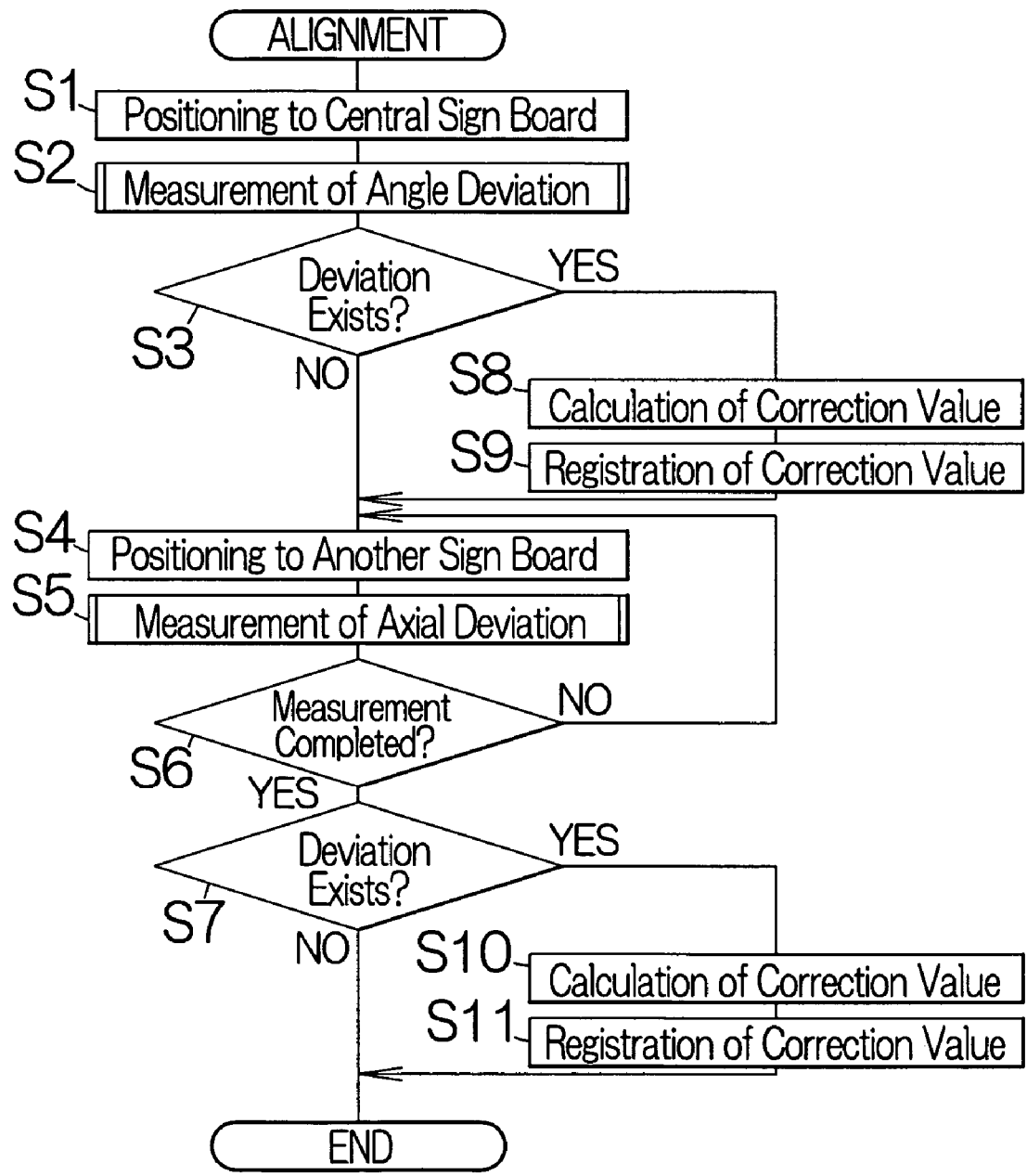
FIG. 8 is a flowchart schematically showing the process of an alignment.

Referring to FIG. 8, a detailed description will be made on the process of the alignment. Assume that the alignment is effected on the storage cabinet 13a. The CPU 62 on the first controller board 61 executes the software program 65 in the non-volatile memory 64, for example. An instruction signal is supplied to the CPU 62 from the library controller board 92 for the execution.

First of all, the first hand 22 is positioned to the central one of the first sign boards 36 at step S1. The x-, y- and z-coordinates and the angle of the first hand 22 around the rotation axis are specified based on values of the specifications of the magnetic tape library apparatus 11. The lowest position is set for the y-coordinate in this case. A stop may be fixed to the first support column near the lower end of the first rail 25 in this case, for example. The guiding member 26 and the first rail base 27 can be positioned at the lowest position based on the collision of the guiding member 26 or the first rail base 27 against the stop. The y-coordinate is thus set based on the lowest position. The central position is set for the z-coordinate. The second rail base 34 is positioned at the center of the second rail 33 in the longitudinal direction based on the z-coordinate. In this case, the second rail base 34 is first positioned at an end limit of the second rail 33. A stop may be fixed to the first rail base 27 near an end of the second rail 33, for example. The second rail base 34 can be positioned at the end limit or reference position based on the collision of the second rail base 34 against the stop. The second rail base 34 is moved to the central position based on values of the specifications from the end limit. One limit end is set for the x-coordinate, for example. The first hand 22 at the end limit gets closest to the storage cabinet 13a. In this case, a stop may be fixed to the second rail base 34 near one end of the third rail 35, for example. The first hand 22 can be positioned at the end limit based on the collision of the first hand 22 against the stop. The angle around the rotation axis is set at zero degree, for example. The centerline of the first hand 22 in the longitudinal direction, namely the longitudinal centerline, is supposed to extend in parallel with the x-axis according to values of the specifications.

An angle deviation is then measured around the rotation axis at step S2. The measurement will be described later in detail. A large angle deviation causes the gasping mechanism 24 to get inclined relative to the magnetic tape cartridge 15 in the cell 14 or the magnetic tape drive 16. The claws 24a thus fail to enter the apertures 15a. The first hand 22 cannot grasp the magnetic tape cartridge 15. As long as the grasping mechanism 24 of the first hand 22 takes an attitude correctly opposed to the flat surface 48 of the first sign board 36, no angle deviation is detected.

If no angle deviation is detected, the first hand 22 is then positioned to a position opposed to the first sign board 36 other than the central one at step S4. At step S5, an axial deviation of the first hand 22 is measured. The measurement will be described later in detail. A large axial deviation prevents the grasping mechanism 24 of the first hand 22 from getting opposed to the opening of the cell 14 or the slot of the magnetic tape drive 16. The grasping mechanism 24 cannot grasp the magnetic tape cartridge 15 in the cell 14 or the magnetic tape drive 16 even without an angle deviation. The claws 24a fail to enter the apertures 15a. The result of the measurement may temporarily be stored in the RAM 63, for example.

At step S6, the CPU 62 judges whether or not the measurement of the axial deviation has been completed for the left and right first sign boards 36. If either one of the first sign boards 36 is not yet subjected to the measurement, the processing of the CPU 62 returns to step S4. The axial deviation is thus measured for the remaining first sign board 36 at step S5. When the measurement of the axial deviation has been completed on both the first signboards 36, the processing of the CPU 62 advances to step S7. If no axial deviation can be found at step S7, the processing of the CPU 62 ends up.

If some angle deviation has been confirmed at step S3, calculation is made to reveal a correction value for the angle at step S8. A specific correction value is assigned to the respective angle deviations as described later. The angle of rotation of the first hand 22, the angle of rotation of the revolution electric motor 71 namely the number of pulses of the driving signal, or the like, may be utilized to specify the correction value. The correction value is stored in the non-volatile memory 64 at step S9. The coordinate of the imaginary xyz-coordinate system or a local coordinate system may be utilized to specify the stored correction value. In this case, the origin of the local coordinate system is aligned at the coordinate according to the specifications. The control of the first hand 22 around the rotation axis based on the correction value forces the longitudinal centerline of the first hand 22 to intersect the flat surface 48 on the first sign board 36 at right angles. The first hand 22 is then positioned at a position opposed to the first sign board 36 based on the corrected angle at step S4.

If some axial deviation has been confirmed as step S7, calculation is made to reveal a correction value for the amount of movement in the axial direction at step S10. A specific correction value is assigned to the respective columns of the cells 14 based on a proration. For example, the deviations in the z-axis or x-axis on the left and right first sign boards 36 are modified in accordance with a ratio of the distance between the cell 14 and one of the left and right first sign boards 36 to the distance between the left and right first sign boards 36. The correction value may correspond to the amount of deviation in the z-axis or x-axis, for example. The amount of movement of the second rail base 34 in the z-axis or of the first hand 22 in the x-axis, the angle of rotation of the z-axis or x-axis electric motor 68, 69 namely the number of pulses of the driving signals, or the like, may be utilized to specify the correction value in the same manner as mentioned above. The correction values are stored in the non-volatile memory 64 at step S11. The coordinate of the imaginary xyz-coordinate system or the aforementioned local coordinate system may be utilized to specify the stored correction value. The control of the first hand 22 in the z-axis or the x-axis based on the correction value forces the longitudinal centerline of the first hand 22 to intersect the centerline 49 on the flat surface 48. In addition, the grasping mechanism 24 is spaced from the flat surface 48 by a predetermined distance. The alignment of this type is carried out for all of the storage cabinets 13a, 13b.

Figure 9:
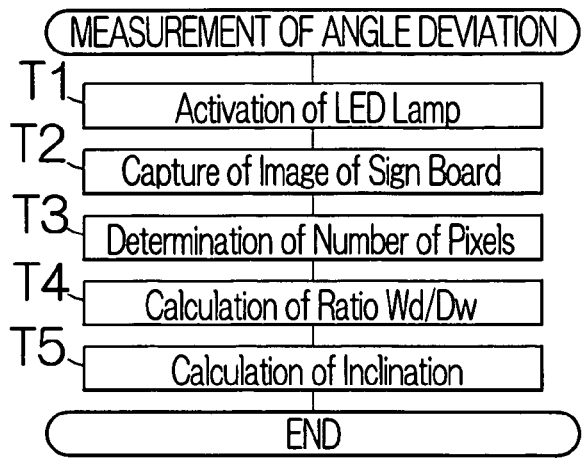
FIG. 9 is a flowchart schematically showing the processings of a CPU measuring an angle deviation.
Figure 10:
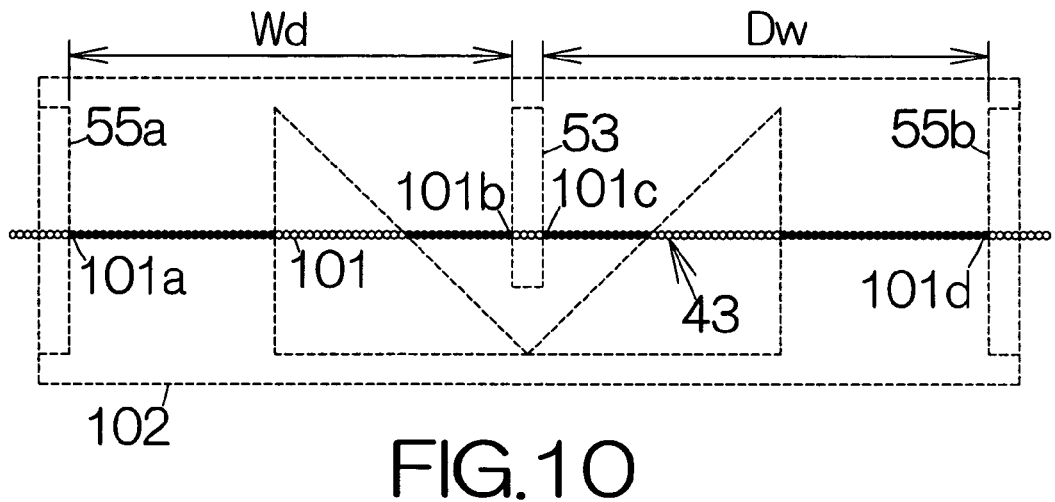
FIG. 10 is a view schematically illustrating the sign board projected over the line of pixels on a CCD.

Referring to FIG. 9, a detailed description will be made on the process of measuring the angle deviation at step S2 in FIG. 8. The LED driver 73 activates the LED lamp 46 in response to instructions from the CPU 62 at step T1. The target space 44 is lighted up in front of the first hand 22. The CPU 62 instructs the line CCD 43 to capture an image at step T2. The colored pattern on the flat surface 48 is projected on the line CCD 43, as shown in FIG. 10, for example. The line of pixels 101 crosses the projected image 102 of the first sign board 36 in the lateral direction. Each of the pixels 101 notifies the CPU 62 of black or white of the colored pattern.

At step T3, the CPU 62 determines the number of pixels between two certain points on the first and second sections 51, 52, respectively. The interval Wd is measured in the first section 51 between the white side strip 55a and the white central strip 53. The interval Dw is likewise measured in the second section 52 between the white central strip 53 and the white side strip 55b. If the notification is made from the leftmost pixel 101 to the rightmost pixel 101, as shown in FIG. 10, for example, a series of signals specifying white is finally detected after a series of signals specifying white and a series of signals specifying black have alternately appeared four times. The interval Wd is counted as the number of pixels between a pixel 101a specifying the first black dot and a pixel 101b specifying the last black dot of the second series of signals specifying black. The interval Dw is thereafter counted as the number of pixels between a pixel 101c specifying the first black dot and a pixel 101d specifying the last black dot of the second series of signals specifying black. In this case, each of the pixels 101, including the pixels 101a-101d, corresponds to 52.5 µm on the first sign board 36.

Figure 11:
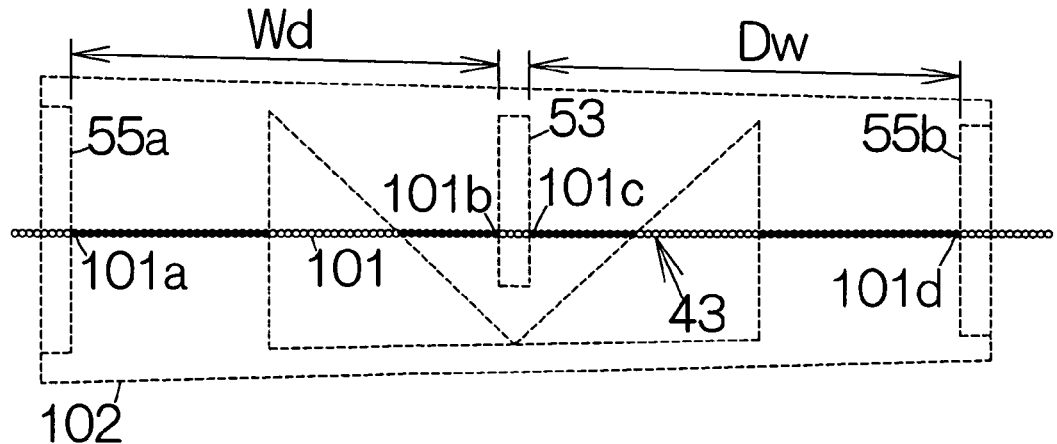
FIG. 11 is a view schematically illustrating the sign board projected over the line of pixels on the CCD when the first hand gets inclined.
Figure 12:
FIG. 12 is a graph showing a correlation between the ratio Wd/Dw calculated based on CAD data and the angle of inclination.

At step T4, the CPU 62 then calculates a ratio Wd/Dw. The CPU 62 determines the angle of rotation of the first hand 22 around the rotation axis or the inclination of the first hand 22 based on the ratio Wd/Dw at step T5. Specifically, when the longitudinal centerline of the first hand 22 is set perpendicular to the flat surface 48 of the first sign board 36, for example, the ratio Wd/Dw takes the value "1", since the interval Wd is set equal to the interval Dw on the flat surface 48. Here, assume that the first hand 22 rotates around the rotation axis in parallel with the centerline 49 of the first sign board 36, for example. In this case, the line CCD 43 gets remoter from the right edge of the first sign board 36 rather than the left edge thereof. As is apparent from FIG. 11, a smaller image of an object is projected on the line CCD 43 as the object get remoter from the line CCD 43. The ratio Wd/Dw thus increases from "1". To the contrary, when the CCD 43 gets remoter from the left edge of the first sign board 36 rather than the right edge thereof based on the rotation of the first hand 22, the ratio Wd/Dw decreases from "1". As is apparent from FIG. 12, a specific correlation can be established between the ratio Wd/Dw and the angle of rotation around the rotation axis in this manner. Accordingly, the determination of the ratio Wd/Dw leads to determination of the angle of rotation. The inclination of the first hand 22 around the rotation axis is in this manner detected based on the distance between the line CCD 43 and the flat surface 48.

Figure 13:
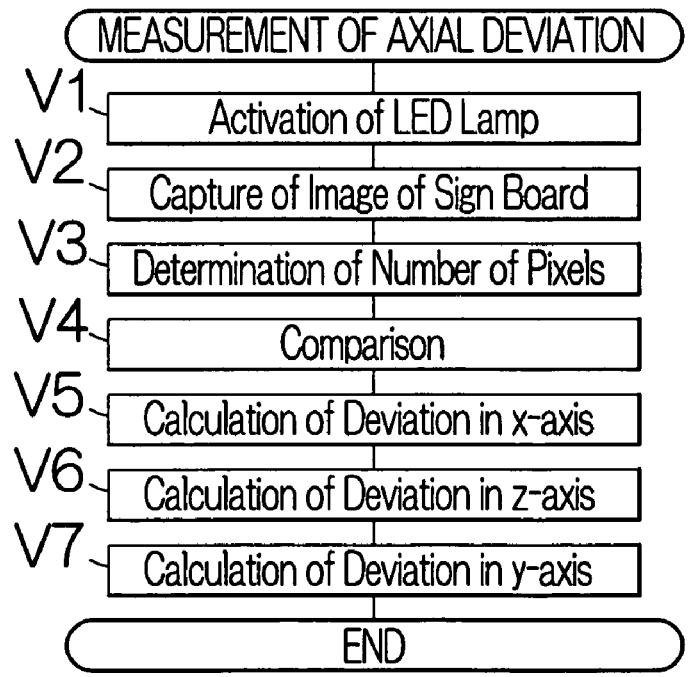
FIG. 13 is a flowchart schematically showing the processings of the CPU measuring an axial deviation.

Referring to FIG. 13, a detailed description will be made on the process of measuring the axial deviation of the first hand 22 at step S5 in FIG. 8. The LED driver 73 first activates the LED lamp 46 in response to instructions from the CPU 62 at step V1. The target space 44 is lighted up in front of the first hand 22. The CPU 62 instructs the CCD 43 to capture an image at step V2. The colored pattern on the flat surface 48 is projected on the CCD 43 in the same manner as described above. Each of the pixels 101 notifies the CPU 62 of black or white of the colored pattern.

At step V3, the CPU 62 determines the number of pixels between first and second points or markings on the flat surface 48. The CPU 62 then compares the determined number with a reference value at step V4. The reference value corresponds to the number of pixels between the first and second points on the flat surface 48 projected on the line CCD 43 when the first hand 22 is spaced from the flat surface 48 at a reference distance. When the first hand 22 is spaced from the flat surface 48 by the reference distance, the claws 24a of the grasping mechanism 24 is precisely opposed to the apertures 15a of the magnetic tape cartridge 15. The first and second points may be selected within the colored pattern, such as the pixels 101a, 101d, for example.

Figure 14:
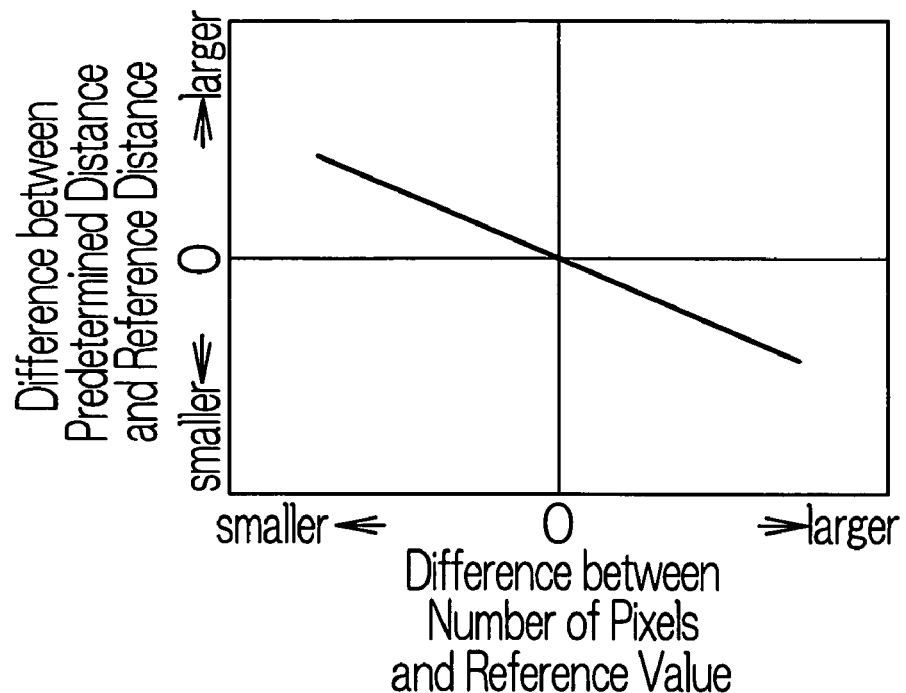
FIG. 14 is a graph showing a correlation between the deviation in the distance and the difference in the number of pixels.

At step V5, the CPU 62 calculates the distance between the first hand 22 and the first sign board 36 based on the result of the comparison. When the first hand 22 gets closer to the first sign board 36 at a distance shorter than the reference distance, the determined number of pixels exceeds the reference value. To the contrary, when the first hand 22 gets remoter from the first sign board 36 at a distance larger than the reference distance, the detected number of pixels falls below the reference value. As is apparent from FIG. 14, a predetermined correlation can be established between a deviation from the reference value and a deviation from the reference distance. Here, the deviation from the reference value corresponds to the difference between the determined number of pixels and the reference value. The deviation from the reference distance corresponds to the difference between the reference distance and a predetermined distance established at the time of capturing an image. In this case, the distance can be measured between the first hand 22 and the first sign board 36 based on the deviation from the reference value. The deviation of the first hand 22 in parallel with the x-axis can in this manner be measured based on the distance between the line CCD 43 and the flat surface 48.

At step V6, the CPU 62 determines the positions of the pixels 101b, 101c. The intermediate position equally spaced from the pixels 101b, 101c is compared with the center of the line of the pixels 161. Here, since the longitudinal centerline of the first hand 22 is set perpendicular to the flat surface 48 while the first hand 22 is spaced from the first sign board 36 by the reference distance, a deviation of the first hand 22 in the z-axis can thus be measured based on the deviation between the intermediate position and the center of the line.

Figure 15:
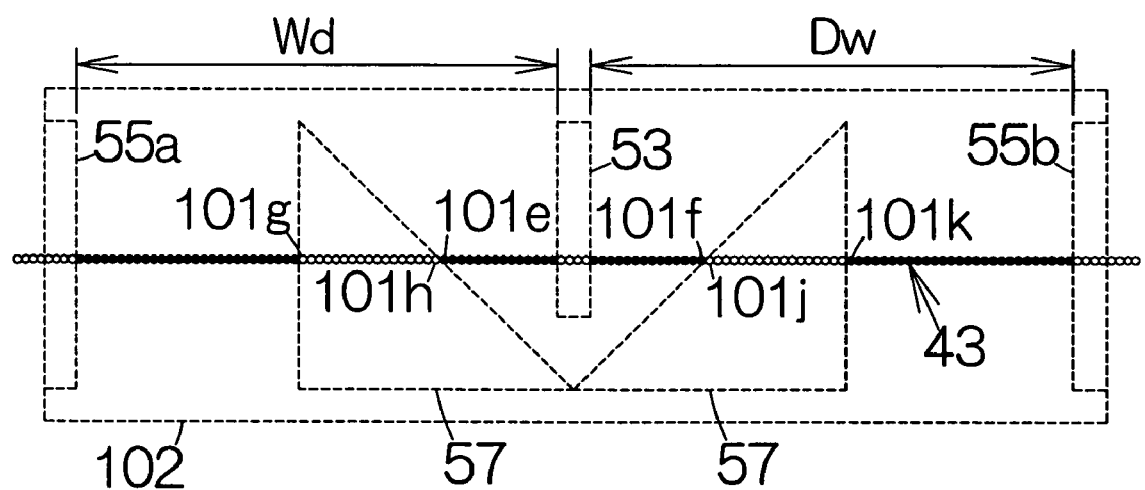
FIG. 15 is a view illustrating an image of the sign board established on the line of the CCD for showing the concept of a deviation in the y-axis.

At step V7, the CPU 62 measures a deviation of the first hand 22 in the y-axis. As shown in FIG. 15, the number of pixels is determined between the pixels 101e, 101f. The total or added number of pixels is likewise determined between the pixels 101g, 101h and between the pixels 101j, 101k. The former determined number is then compared with the latter determined number. The former determined number equal to the latter determined number reveals the center of the hypotenuse 57a, 57b in view of the isosceles right triangles 57, 57. If the first hand 22 moves upward along the y-axis relative to the first sign board 36, the number of pixel increases between the pixels 10le, 101f. The total number of pixels decreases between the pixels 101g, 101h and between the pixels 101j, 101k. On the contrary, when the first hand 22 moves downward along the y-axis relative to the first sign board 36, the number of pixels decreases between the pixels 101e, 101f, while the total number of pixels increases between the pixels 101g, 101h and between the pixels 101j, 101k. The deviation of the first hand 22 in the y-axis can thus be measured based on the aforementioned comparison of the numbers of pixels.

When the alignment has been completed, correction of the positions of the cells 14 are conducted in each of the storage cabinets 13a, 13b. The CPU 62 first serves to position the first hand 22 at positions opposed to each of the second sign boards 37. The distance is measured between the first hand 22 and the second sign boards 37, respectively. The number of pixels may be counted between the first and second points on the second sign board 37 in the same manner as described above. Since the openings of the cells 14 are arranged within a predetermined imaginary plane, the attitude of the predetermined imaginary plane can thus be determined based on the measurement for the second sign boards 37 at three corners. Correction values can thus be calculated for the individual cells 14 based on a prorate.

Figure 16:
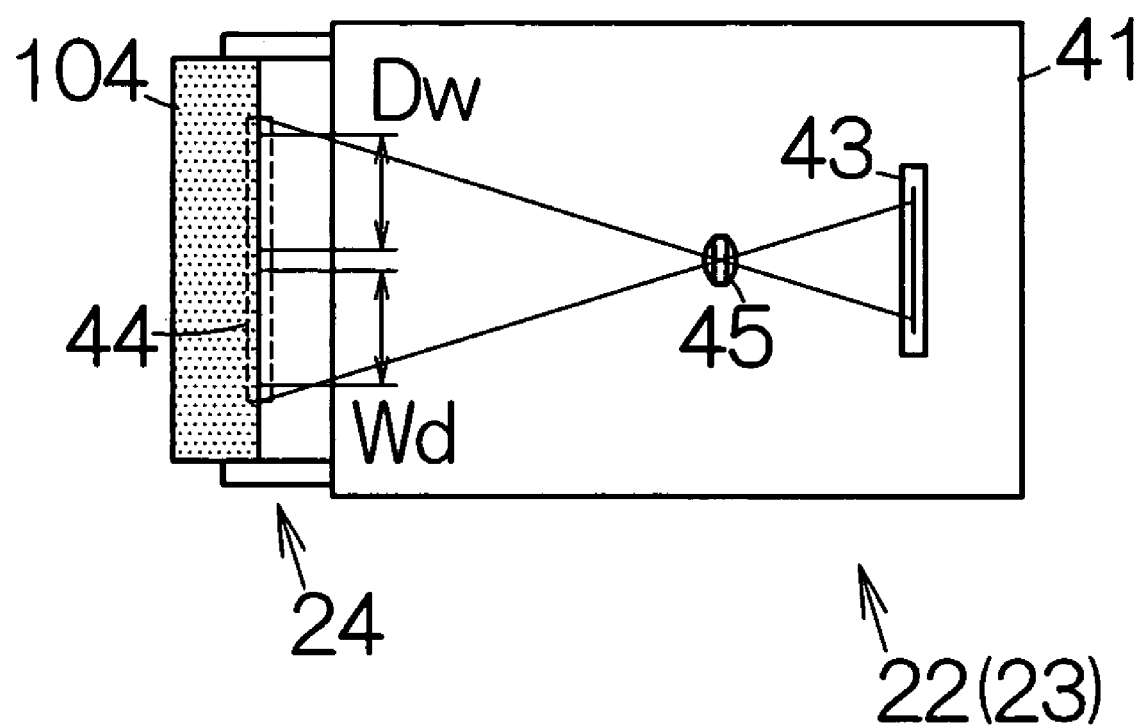
FIG. 16 is a plan view of the first and second hands schematically illustrating a positional relationship between a jig and the CCD.

A deviation is measured between the line CCD 43 and the grasping mechanism 24 in the first hand 22 prior to the aforementioned alignment and the aforementioned correction of the positions of the cells 14. As shown in FIG. 16, a jig 104 is set on the grasping mechanism 24 for the measurement. The jig 104 is held between the claws 24a in the same manner as the magnetic tape cartridge 15. The jig 104 can thus reflect the attitude of the grasping mechanism 24.

The aforementioned colored pattern is also established on the jig 104 in the same manner as the first and second sign boards 36, 37. The colored pattern is located within the target space 44. The ratio Wd/Dw of the number of pixels is calculated based on the colored pattern projected on the line CCD 43 in the same manner as described above. A deviation is determined for the line CCD 43 around the vertical axis relative to the grasping mechanism 24 based on the ratio Wd/Dw. The deviation as the correction data 75 is stored in the non-volatile memory 74.

The CPU 62 reads the correction data 75 out of the non-volatile memory 74 prior to the aforementioned alignment or correction of the positions. The CPU 62 adjusts the attitude of the line CCD 43 based on the correction data 75 so as to position the first hand 22 with a higher accuracy. This results in a higher accuracy of the aforementioned correction value based on the result of the measurement utilizing the CCD 43. The grasping mechanism 24 is thus allowed to reliably hold the magnetic tape cartridge 15 in the cell 14 or the magnetic tape drive 16.

The aforementioned alignment can also be applied to the second hand 23. The aforementioned processes may be executed in the CPU 77 on the second controller board 76. The correction data 91 may be written into the non-volatile memory 89 based on employment of the jig 104 in the same manner as described above. The first sign boards 36 may be located in a space above the storage cabinets 13a, 13b, for example.

The aforementioned alignment may be conducted during replacement of the first hand 22. In this case, the aforementioned correction of the positions of the cells 14 can be omitted. The result of the aforementioned correction may be utilized without any change. The correction data 75 may be measured for the first hand 22 prior to the incorporation of the first hand 22 into the magnetic tape library apparatus 11.

It should be noted that the aforementioned processes may be executed in the CPU 93 on the library controller board 92 instead of the CPU 62.

What is claimed is:

1. A method of detecting an inclination in a library apparatus, comprising:
    setting a jig on a grasping unit of a robot hand;
    calculating a first ratio between a first number of pixels and a second number of pixels on an image sensor mounted on the robot hand, the first number of pixels being counted between two points projected on the image sensor from a first section of a first plane, the second number of pixels being counted between two points projected on the image sensor from a second section, adjacent to the first section, of the first plane, the first plane being defined on the jig;
    determining a first inclination of the image sensor relative to the grasping unit based on the first ratio and a reference ratio specifying a predetermined attitude of the image sensor;
    directing the grasping unit to a sign immobilized relative to a storage cabinet;
    calculating a second ratio between a third number of pixels and a fourth number of pixels on the image sensor, the third number of pixels being counted between two points projected on the image sensor from a third section of a second plane, the fourth number of pixels being counted between two points projected on the image sensor from a fourth section, adjacent to the third section, of the second plane, the second plane being defined on the sign;
    determining a second inclination of the image sensor relative to the sign based on the second ratio and the reference ratio specifying the predetermined attitude of the image sensor; and
    canceling an angular deviation based on the first inclination so as to determine the second inclination.

2. The method according to claim 1, further comprising canceling the angular deviation of the image sensor based on the second inclination determined.

3. The method according to claim 1, wherein the attitude of the image sensor changes around a rotation axis extending in parallel with the second plane.

4. The method according to claim 1, wherein parallel marking lines are established on the second plane at the third section, the parallel marking lines providing the points on the third section, respectively, while parallel marking lines are established on the second plane at the fourth section, the parallel marking lines providing the points on the fourth section, respectively.

5. A computer-readable medium containing program instructions allowing a processor to perform a method of detecting an inclination in a library apparatus, said method comprising:
calculating a first ratio between a first number of pixels and a second number of pixels on an image sensor mounted on the robot hand, the first number of pixels being counted between two points projected on the image sensor from a first section of a first plane, the second number of pixels being counted between two points projected on the image sensor from a second section, adjacent to the first section, of the first plane, the first plane being defined on the jig set on a grasping unit of the robot hand;
determining a first inclination of the image sensor relative to the grasping unit based on the first ratio and a reference ratio specifying a predetermined attitude of the image sensor;
calculating a second ratio between a third number of pixels and a fourth number of pixels on the image sensor, the third number of pixels being counted between two points projected on the image sensor from a third section of a second plane, the fourth number of pixels being counted between two points projected on the image sensor from a fourth section, adjacent to the third section, of the second plane, the second plane being defined on a sign immobilized relative to a storage cabinet;
determining a second inclination of the image sensor relative to the sign based on the second ratio and the reference ratio specifying the predetermined attitude of the image sensor; and
canceling an angular deviation based on the first inclination so as to determine the second inclination.

6. The computer-readable medium according to claim 5, wherein said method further comprising canceling the angular deviation of the image sensor based on the second inclination determined.

7. The computer-readable medium according to claim 5, wherein the attitude of the image sensor changes around a rotation axis extending in parallel with the second plane.

8. The computer-readable medium according to claim 5, wherein parallel marking lines are established on the second plane at the third section, the parallel marking lines providing the points on the third section, respectively, while parallel marking lines are established on the second plane at the fourth section, the parallel marking lines providing the points on the fourth section, respectively.

9. An inclination detecting apparatus comprising:
an image sensor mounted on a robot hand, the image sensor capturing an image of a first section of a first plane and a second section, adjacent to the first section, of the first plane, the first plane being defined on a jig set on a grasping unit of the robot hand, the image sensor capturing an image of a third section of a second plane and a fourth section, adjacent to the third section, of the second plane, the second plane being defined on a sign immobilized relative to a storage cabinet; and
a processing circuit determining a first inclination of the image sensor relative to the grasping unit and a second inclination of the image sensor relative to the sign, the processing circuit configured to cancel an angular deviation based on the first inclination so as to determine the second inclination, the first inclination being determined based on a first ratio calculated based on an image signal supplied from the image sensor and a reference ratio specifying a predetermined attitude of the image sensor, the first ratio being calculated between a first number of pixels counted between two points projected on the image sensor from the first section and a second number of pixels counted between two points projected on the image sensor from the second section, the second inclination being determined based on a second ratio calculated based on the image signal supplied from the image sensor and the reference ratio specifying the predetermined attitude of the image sensor, the second ratio being calculated between a third number of pixels counted between two points projected on the image sensor from the third section and a fourth number of pixels counted between two points projected on the image sensor from the fourth section.

10. The inclination detecting apparatus according to claim 9, wherein the image sensor is mounted on an object such that an attitude of the object is changeable around a rotation axis extending in parallel with the second plane.

11. The inclination detecting apparatus according to claim 9, wherein first parallel marking lines are established on the second plane at the third section, the parallel marking lines providing the points on the third section, respectively, while parallel marking lines are established on the second plane at the fourth section, the parallel marking lines providing the points on the fourth section, respectively.

12. A library apparatus comprising:
a storage cabinet defining cells;
a robot hand configured to move relative to the storage cabinet so as to individually access the cells;
an image sensor mounted on the robot hand, the image sensor configured to capture an image of a first section of a first plane and a second section, adjacent to the first section, of the first plane, the first plane being defined on a jig set on a grasping unit of the robot hand, the image sensor configured to capture an image of a third section of a second plane and a fourth section, adjacent to the third section, of the second plane, the second plane being defined on a sign immobilized relative to a storage cabinet; and
a processing circuit determining a first inclination of the image sensor relative to the grasping unit and a second inclination of the image sensor relative to the sign, the processing circuit configured to cancel an angular deviation based on the first inclination so as to determine the second inclination, the first inclination being determined based on a first ratio calculated based on an image signal supplied from the image sensor and a reference ratio specifying a predetermined attitude of the image sensor, the first ratio being calculated between a first number of pixels counted between two certain points projected on the image sensor from the first section and a second number of pixels counted between two certain points projected on the image sensor from the second section, the second inclination being determined based on a second ratio calculated based on the image signal supplied from the image sensor and the reference ratio specifying the predetermined attitude of the image sensor, the second ratio being calculated between a third number of pixels counted between two points projected on the image sensor from the third section and a fourth number of pixels counted between two points projected on the image sensor from the fourth section.

13. The library apparatus according to claim 12, wherein the grasping unit is rotatable around a rotation axis extending in parallel with the second plane.

14. The library apparatus according to claim 12, wherein the sign includes first parallel marking lines established on the second plane at the third section, the parallel marking lines providing the certain points on the third section, respectively, and parallel marking lines established on the second plane at the fourth section, the parallel marking lines providing the certain points on the fourth section, respectively.

* * * * *